April 12, 1932.  T. N. PIERSON  1,853,776
GRAIN PAN AND CUTTER BAR BRACE
Filed Feb. 11, 1929  2 Sheets-Sheet 1
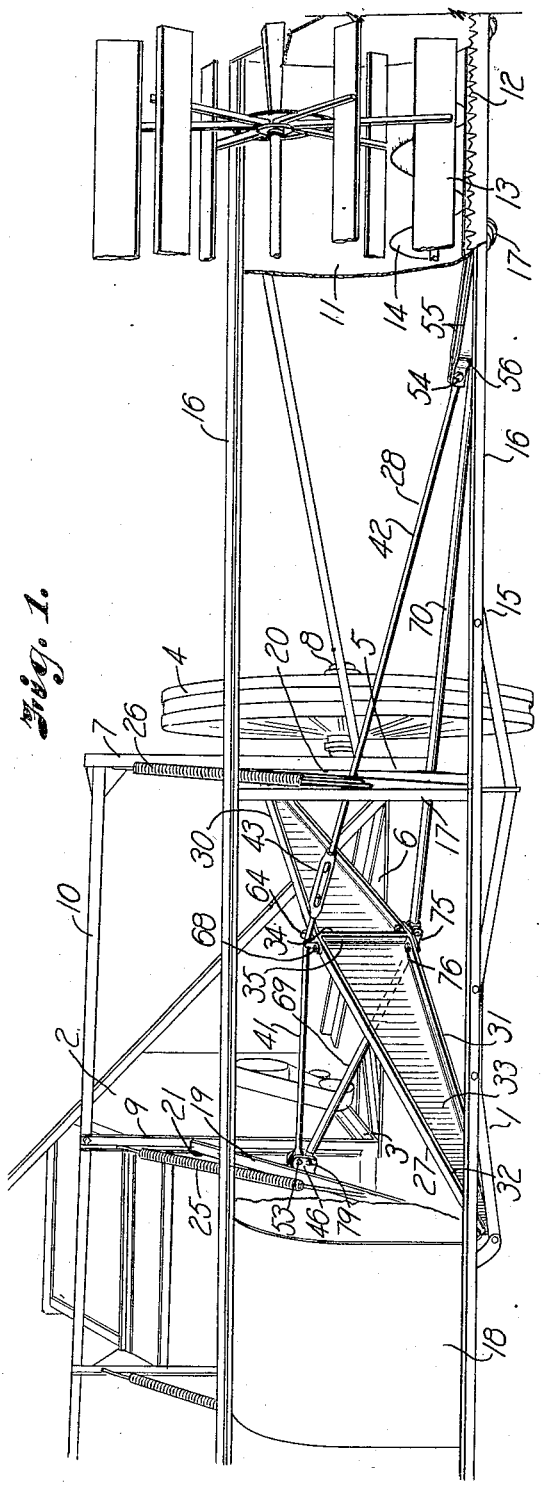
INVENTOR
*Torvald N. Pierson.*
BY
ATTORNEY

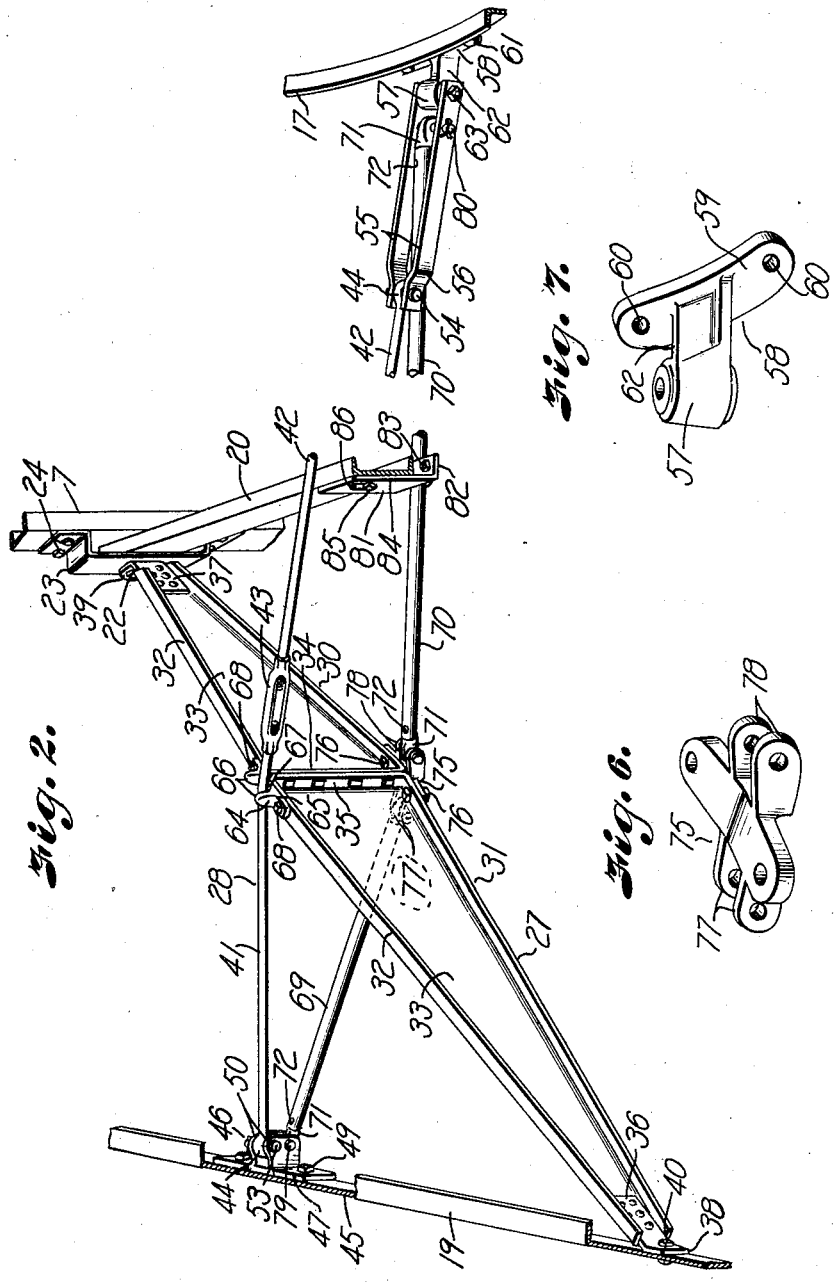

Patented Apr. 12, 1932

1,853,776

UNITED STATES PATENT OFFICE

TORVALD N. PIERSON, OF INDEPENDENCE, MISSOURI, ASSIGNOR TO THE GLEANER COMBINE HARVESTER CORPORATION, OF INDEPENDENCE, MISSOURI, A CORPORATION

GRAIN PAN AND CUTTER BAR BRACE

Application filed February 11, 1929. Serial No. 339,234.

My invention relates to combined harvesting and threshing machines of the type more fully illustrated in Patent No. 1,702,323, issued February 19, 1929 to Clarence A. Stevens, George D. Baldwin and John Irl Michaels on which the present invention is an improvement, and more particularly to means for supporting the adjustable sub-frame and its load from the main frame of the machine, the principal object of the invention being to provide supporting trusses of minimum weight that will effectively suspend and brace the sub-frame.

It is also a further object of the invention to provide a support that may be readily adjusted for aligning the sub-frame.

In accomplishing these and other objects of the invention, I have provided improved details of structure, the preferred forms of which are illustrated in the accompanying drawings, wherein:

Fig. 1 is a perspective view of a portion of a combined harvesting and threshing machine, showing the inner end of the grain pan, sickle bar, and reel broken away to better illustrate my invention.

Fig. 2 is an enlarged perspective view of the truss members, illustrating their attachment to the frame-work of the machine.

Fig. 3 is a detail perspective view of one of the rod truss fittings for securing one end of the rod truss to the arm carrying the inner end of the sub-frame.

Fig. 4 is a detail perspective view of an end of one of the rod truss members.

Fig. 5 is a detail perspective view of the bracket for attaching the rod truss to the arm carrying the outer end of the sub-frame.

Fig. 6 is a detail perspective view of the center strut fitting.

Fig. 7 is a detail perspective view of the bracket for attaching the outer end of the rod truss to the outer end of the sub-frame.

Referring in detail to the drawings:

1 designates a combined harvesting and threshing machine including a separating mechanism indicated by the housing 2 which is carried on a main frame 3 supported by a main traction wheel (not shown) and balanced by a grain wheel 4 that is carried laterally of and parallel with the housing 2 by a lateral frame-work 5 forming part of the main frame.

The frame-work 5 includes a channel 6 attached to and extending laterally of the main frame and carries at its free end a vertical channel post 7 supporting a spindle 8 on which the grain wheel is rotatably mounted. The channel 6 is suitably braced to the rear of the frame 3 and the vertical channel 7 is connected at its upper end with a similar post 9, adjacent the separator housing by an angle 10 extending parallel with the channel 6.

The cutting mechanism includes a grain pan 11, a sickle bar 12 extending along the front edges of the grain pan, a reel 13 and a screw conveyor 14 rotatably mounted in the grain pan for conveying the cut grain to the separator mechanism, and which together with a feeder housing 18 for receiving grain from the conveyor and a threshing element (not shown) adapted to receive grain directly from the feeder housing 18, carried by a sub-frame 15 adjustably mounted on the main frame and preferably consisting of longitudinal angle members 16, and cross angle members 17 curved to conform to the shape of the pan and pivotally suspended from the posts 7 and 9 by arms comprising angle bars 19 and 20. The arm 19 is pivoted to the post 9 by a bolt 21 and the bar 20 is pivoted to the post 7 by a bolt 22 extending through the post 7 and through a bracket 23 at the opposite side of the bar and which is bolted to the post as at 24, the free ends of both arms 19 and 20 being attached to the sub-frame 15 carrying the grain pan.

Thus it will be seen that the weight of the entire grain cutting and threshing mechanism is carried at the free ends of the angle arms 19 and 20 and that the weight must necessarily be suspended from the main frame including the lateral frame-work 5. This suspension is effected by the arms 19 and 20 in conjunction with counterbalance springs 25 and 26 respectively connecting the post 9 with the forward end of the arm 19 and the channel post 7 with the forward end of the arm 20.

To prevent the grain cutting mechanism from being thrown out of alignment with cooperating parts by twist and sag of the grain pan when the machine is in operation, I provide crossed trusses 27 and 28, 69—70 one of which is connected with the bracket 23 on the post 7 by the bolt 22, whereby the arm 20 is pivotally mounted on the pan, and with the arm 19 at a point adjacent its connection with the grain pan, and the other with an inner portion of the arm 19 and with the outer end of the frame 15.

The truss 27 is of the plate type and comprises triangle members 30 and 31 having peripheral flanges 32 extending laterally from one side of the web portions 33 and base flanges 34 and 35 which are secured together to provide a substantially diamond shaped truss member.

Attaching plates 36 and 37 are riveted to the respective ends of the web portion of the truss and are provided with apertured ears 38 and 39 extending from the ends of the truss member, the ear 38 being bent forwardly and the ear 39 rearwardly parallel with the angle arms 19 and 20 respectively so that the bolt 22 may be passed through the ear 39 and a bolt 40 on the arm 19 through the ear 38 to secure the truss diagonally between the supporting arms.

The truss 28, 69—70 includes upper and lower members, the upper member consisting of rods 41 and 42 connected by a turn buckle 43 by which its length may be adjusted, and having eyes 44 at their outer ends for connection with the arm 19 and frame 15 as will presently be described, the rod passing over the truss 27 to serve as a strut therefor.

Fixed to the vertical flange 45 of the supporting arm 19 and in alignment with the end of the upper truss member 28 is a bracket 46 comprising a plate 47 having openings 48 through which bolts 49 are projected to secure the bracket to the arm, and extending from the face of the plate are spaced ears 50 having pairs of aligning openings 51 and 52. The eye 44 of the rod 41 is received between the ears and a pin 53 is inserted through the openings 51 and through the eye to secure the end of the rod to the arm. The end of the other rod 42 is secured by a bolt 54 to a pair of straps 55, one at each side of the rod, with the bolt extending through openings in the straps and through the eye of the rod.

The free ends of the straps adjacent the eye are provided with offsets 56 for spreading the straps a sufficient distance to receive the sleeve portion 57 of a bracket 58 therebetween. The bracket 58 includes a plate 59 having openings 60 (Fig. 7) to receive bolts 61 for securing the bracket to one of the end cross members as shown in Fig. 2. The sleeve 57 of the bracket is integral with the plate portion, being connected therewith by an arm 62. A bolt 63 is inserted through openings provided in the ends of the straps and through the sleeve to secure the straps to the bracket.

The upper truss member 28, formed by the rods 41 and 42, extends across the apex of the truss 27 and rests in a saddle 64 fixed to the top flanges of the truss 27 and comprising a plate portion 65 having integral spaced lugs 66 projecting therefrom to provide a seat 67 for receiving the rod member, the saddle being bolted to the flange of the truss by bolts 68.

The lower member of the rod truss member comprises pipe sections 69 and 70 having apertured lugs 71 received in the ends of the pipe sections and retained therein by rivets 72 projected through openings 73 in the pipe sections and through aligning openings 74 in the lugs.

The adjoining ends of the pipe sections are hingedly secured to the truss 27 by a casting 75 which is bolted to the lower flanges of the truss 27 by bolts 76 as shown in Figs. 1 and 2. The casting 75 is provided with pairs of ears 77 and 78 extending from opposite sides of the casting and having openings therein for fastening devices which are projected through the openings and through the apertures of the lugs 71 to secure the pipe sections to the truss 27.

The outer end of the section 69 is secured to the bracket 46 on arm 19 by a pin 79 projected through the lug 71 and through the lower pair of openings 52 in the bracket 46 and the outer end of the section 70 is pivoted on a pin 80 extending through the straps 55 adjacent the bracket 58 on a cross member 17 of the bracket 15. This section of the truss is also connected with the angle arm 20 by an L shaped bracket 81 depending from the arm, the horizontal portion 82 of the bracket being secured to the truss section by a U bolt 83 and the vertical portion 84 adjustably fixed to the arm by a bolt 85 extending through an opening in the arm and a slot 86 in the bracket.

In aligning the cutting mechanism the turnbuckle 43 is adjusted to lift or lower the outer end of the grain pan until the pan is level and at right angles to the main frame of the machine. Should the grain pan sag or become loose, it may be readily straightened or tightened by adjusting the turnbuckle.

It will be noted that the tensioning of the truss does not apply strain to the frame work of the machine since the trusses are pivotally mounted at their ends and readily adjust themselves without straining their connections to the frame work.

What I claim and desire to secure by Letters Patent is:

1. In a machine of the character described, a main frame, a sub-frame pivotally mounted on the main frame, truss members bracing the sub-frame from the main frame, one of said trusses crossing the other and comprising flexibly connected rods, and means for adjusting the rods to tension the truss.

2. In a machine of the character described including a main frame, paired arms pivoted to the main frame, a sub-frame supported by said arms, a truss connecting one of the arms adjacent its pivot with an end of the sub-frame, a second truss having flexible connections with the other arm and with the opposite end of the sub-frame, and means for tensioning the last named truss to level the subframe.

3. In a machine of the character described, a main frame, a sub-frame, arms pivotally suspending the sub-frame from the main frame, a diagonal truss pivotally mounted on the main frame coaxially with one of the arms and pivotally attached to the other arm near the forward end thereof, and a cross truss flexibly connecting the last mentioned arm with the sub-frame to permit adjustment of the sub-frame.

4. In a machine of the character described, a main frame, a sub-frame, arms pivotally suspending the sub-frame from the main frame, a diagonal truss pivotally mounted on the main frame coaxially with one of the arms and attached to the other arm near the forward end thereof, and a cross truss flexibly connecting the last mentioned arm with the sub-frame, the cross truss being adjustable for leveling the sub-frame with the main frame.

5. In a machine of the character described, a main frame, a sub-frame, arms pivotally suspending the sub-frame from the main frame, a diagonal truss pivotally mounted on the main frame coaxially with one of the arms and attached to the other arm near the forward end thereof, and a cross truss pivotally connected with the last mentioned arm and with the sub-frame and seated on the diagonal truss.

6. In a machine of the character described, a main frame, a sub-frame, arms pivotally suspending the sub-frame from the main frame, a diagonal truss pivotally mounted on the main frame coaxially with one of the arms and attached to the other arm near the forward end thereof, and an adjustable cross truss pivotally connected with the last mentioned arm and with the sub-frame and seated on the diagonal truss.

7. In a machine of the character described, a main frame, a sub-frame, arms pivotally suspending the sub-frame from the main frame, a diagonal truss pivotally mounted on the main frame coaxially with one of the arms and attached to the other arm near the forward end thereof, and a cross truss including a primary member having flexible connections with the last mentioned arm and with the sub-frame and a secondary member having flexible connections with said last mentioned arm and with the primary member.

8. In a machine of the character described, a main frame, a sub-frame, arms pivotally suspending the sub-frame from the main frame, a diagonal truss pivotally mounted on the main frame coaxially with one of the arms and attached to the other arm near the forward end thereof, and a cross truss including a primary member having flexible connections with the last mentioned arm and with the sub-frame and seated on the diagonal truss and a secondary member including sections connecting the lower edge of the diagonal truss respectively with the said last mentioned arm and with the primary member.

9. In a machine of the character described, a main frame, a sub-frame, arms pivotally suspending the sub-frame from the main frame, a diagonal truss pivotally mounted on the main frame coaxially with the pivot point of one of the arms and cooperating with the other arm in supporting the sub-frame, a cross truss including a primary member having flexible connections with the last mentioned arm and with the sub-frame and seated on the diagonal truss, and a secondary member including sections pivotally connected with the last mentioned arm and the truss and with the truss and the primary member respectively, and means for adjusting the primary member to level the sub-frame.

10. In a machine of the character described, a main frame, a sub-frame, arms pivotally suspending the sub-frame from the main frame, a diagonal truss pivotally mounted on the main frame coaxially with one of the arms and cooperating with the other arm for supporting the sub-frame, a cross truss including a primary member having flexible connections with the last mentioned arm and having bearing on the diagonal truss, a strap member pivoted to the sub-frame and pivotally connected to the primary member, a secondary member including sections connecting the lower edge of the diagonal truss respectively with the last mentioned arm and with the strap member, and means for tensioning the primary member to level the sub-frame.

11. In a machine of the character described a main frame, a sub-frame, arms pivotally suspending the sub-frame from the main frame, a diagonal truss pivotally mounted on the main frame coaxially with the pivot point of one of the arms and cooperating with the other arm in supporting the sub-frame, a cross truss including a primary member having pivotal connection with the last mentioned arm and having bearing on the diagonal truss, strap members pivoted to the sub-frame and pivotally connected with the primary member, a secondary member including sections connecting the lower edge of the diagonal truss respectively with the last mentioned arm and with the strap members intermediate their ends, and means for tensioning the primary member to level the sub-frame.

12. In a machine of the character described a main frame, a sub-frame, arms pivotally suspending the sub-frame from the main frame, a diagonal truss pivotally mounted on the main frame coaxially with one of the arms and cooperating with the other arm in supporting the sub-frame, a cross truss flexibly connecting the last mentioned arm with the sub-frame, and means for tensioning the cross truss for leveling the sub-frame with relation to the main frame.

13. In a machine of the character described, a main frame, a sub-frame, arms pivotally suspending the sub-frame from the main frame, a truss member extending diagonally between the arms and cooperating therewith to support the sub-frame, a cross truss having flexible connections with one of the arms and with the sub-frame, and means for tensioning the cross truss to level the sub-frame.

In testimony whereof I affix my signature.

TORVALD N. PIERSON.